US012033782B2

(12) United States Patent
Shima et al.

(10) Patent No.: US 12,033,782 B2
(45) Date of Patent: Jul. 9, 2024

(54) STACKED CORE FOR STATIONARY INDUCTION APPARATUS

(71) Applicant: Toshiba Industrial Products and Systems Corp., Kanagawa (JP)

(72) Inventors: Yuusuke Shima, Mie (JP); Hiromu Shiota, Mie (JP)

(73) Assignee: Toshiba Industrial Products and Systems Corp., Kanagawa (JP)

( * ) Notice: Subject to any disclaimer, the term of this patent is extended or adjusted under 35 U.S.C. 154(b) by 641 days.

(21) Appl. No.: 17/290,312

(22) PCT Filed: Oct. 23, 2019

(86) PCT No.: PCT/JP2019/041505
§ 371 (c)(1),
(2) Date: Apr. 30, 2021

(87) PCT Pub. No.: WO2020/090577
PCT Pub. Date: May 7, 2020

(65) Prior Publication Data

US 2021/0391111 A1 Dec. 16, 2021

(30) Foreign Application Priority Data

Nov. 1, 2018 (JP) ................................. 2018-206549

(51) Int. Cl.
*H01F 27/24* (2006.01)
*H01F 27/245* (2006.01)

(52) U.S. Cl.
CPC .................................. *H01F 27/245* (2013.01)

(58) Field of Classification Search
CPC ...................................................... H01F 27/245
(Continued)

(56) References Cited

U.S. PATENT DOCUMENTS 2,300,964 A * 11/1942 Putman ................. H01F 27/245 29/605
2,387,943 A * 10/1945 Putman ................. H01F 27/245 336/212
(Continued)

FOREIGN PATENT DOCUMENTS

JP S6021510 A 2/1985
JP 63-20811 1/1988
(Continued)

OTHER PUBLICATIONS

European Extended Sear Report in Application No. 19880193.8-1212/3876248 PCT/JP2019041505, dated Jul. 8, 2022.
(Continued)

*Primary Examiner* — Ronald Hinson
(74) *Attorney, Agent, or Firm* — DLA Piper LLP (US)

(57) ABSTRACT

In a stacked core (1, 21) for a stationary induction apparatus according to an embodiment, joint surfaces where yoke portions (2, 3, 12, 22, 23) and leg portions (4, 5, 6, 11, 24, 25, 26) are joined have protrusions (8, 13) formed from a plurality of magnetic members (7), and recesses (9, 14) formed from a plurality of magnetic members alternately, and the yoke portions and the leg portions are configured to be butted in such a form that the protrusions and the recesses mesh with each other, sheet-like magnetic insulators (10, 15) are each disposed in a butt-joint portion between the protrusions and the recesses in such a form as to bend in a bellows shape along a butt line, and an air gap is provided, and in a relationship between the number of the stacked magnetic members forming each of the protrusions and the number of the stacked magnetic members forming each of the recesses, the number of the stacked magnetic members forming each of the protrusions is made smaller than the number of the stacked magnetic members forming each of
(Continued)

the recesses corresponding to a thickness of the magnetic insulator.

6 Claims, 6 Drawing Sheets

(58) Field of Classification Search
USPC .................................. 336/215, 216, 217, 218
See application file for complete search history.

(56) References Cited

U.S. PATENT DOCUMENTS 2,698,924 A * 1/1955 Gordy ................... H01F 27/245 336/215
2,821,688 A * 1/1958 Gordy ................... H01F 27/245 336/5
2,830,277 A * 4/1958 Kane ..................... H01F 41/024 336/216
3,156,886 A * 11/1964 Sutherland .............. H01F 30/10 336/215
3,157,850 A * 11/1964 Winter .................. H01F 27/245 336/215
3,183,461 A * 5/1965 Tipton .................... H01F 27/08 336/212
3,195,092 A * 7/1965 Tumbusch ............. H01C 10/32 338/148
3,210,708 A * 10/1965 Franklin ............... H01F 27/245 336/217
3,252,119 A * 5/1966 Graham ................ H01F 27/245 336/212
3,309,641 A * 3/1967 Burkhardt ........... H01F 27/2455 336/213
3,370,350 A * 2/1968 Logan ..................... H01F 27/25 335/297
3,538,474 A * 11/1970 Olsen .................. H01F 27/2455 336/212
3,546,645 A * 12/1970 Frowein ................ H01F 27/245 336/60
3,614,696 A * 10/1971 Douglass .............. H01F 27/245 336/215
3,670,279 A * 6/1972 Millsop ............... H01F 41/0233 29/609
3,743,991 A * 7/1973 Gumpper .............. H01F 27/245 336/217
3,918,153 A * 11/1975 Burkhardt ............. H01F 27/245 29/609
4,241,324 A * 12/1980 Douglass .............. H01F 27/245 336/217
4,761,630 A * 8/1988 Grimes ............... H01F 27/2455 336/213
4,864,267 A * 9/1989 Banjoya ................ H01F 27/245 336/217
5,073,766 A * 12/1991 Hays ...................... H01F 27/245 29/606
5,146,198 A * 9/1992 Pollard ................. H01F 27/245 336/212
6,100,783 A * 8/2000 Hopkinson ........... H01F 27/245 336/216
2013/0002392 A1* 1/2013 Parashar ............... H01F 27/245 977/773

FOREIGN PATENT DOCUMENTS

JP S63 20811 A 1/1988
JP 7-220942 8/1995
JP 2009-054927 A 3/2009
JP 2010-287756 12/2010
JP 2011-134794 7/2011
JP 2011-243792 12/2011
JP 2014-78639 5/2014
TW 1475577 B 1/2015
WO WO 2010/143710 A1 12/2010

OTHER PUBLICATIONS

Internationl Search Report in PCT/JP2019/041505 dated Dec. 4, 2019.
Chinese Office Action in CN Application No. 201980066364.0, dated Jan. 30, 2024.
India Office Action IN Application No. 202147018768, dated Sep. 29, 2021.

* cited by examiner

STACKED CORE FOR STATIONARY INDUCTION APPARATUS

CROSS REFERENCE TO RELATED APPLICATIONS

This application is a U.S. National Stage Application of International Application No. PCT/JP2019/041505 filed Oct. 23, 2019, which is based upon Japanese Patent Application No. 2018-206549 filed on Nov. 1, 2018, the contents of which are incorporated herein by reference.

TECHNICAL FIELD

An embodiment of the present invention relates to a stacked core for a stationary induction apparatus.

BACKGROUND ART

In a core of a stationary induction apparatus, for example, a transformer, a stacked core configured by stacking a plurality of magnetic members such as silicon steel sheets is known (see, for example, Patent Literature 1). In this stacked core, the magnetic members are stacked while alternately shifting at butt-joint portions between upper and lower yoke portions and leg portions connecting the upper and lower yoke portions. Further, non-magnetic sheet members are each disposed at a joint portion where the yoke portion and the leg portion are joined. Consequently, an air gap corresponding to the thickness of the sheet member is secured at each of the joint portions of the stacked core, and the residual magnetic flux density is reduced, and an excitation inrush current is suppressed.

CITATION LIST

Patent Literature

Patent Literature 1: Japanese Patent Laid-Open No. 2010-287756

SUMMARY OF INVENTION

In the configuration in which the non-magnetic sheet member is provided in each air gap portion of the stacked core as described above, the thickness dimension of the sheet member corresponds to the gap dimension, and the gap dimension is adjusted, so that the magnetic characteristic can be controlled. However, in the configuration of Patent Literature 1, the sheet member is also disposed at a portion where the sheet surfaces of the stacked magnetic members overlap each other, and a gap corresponding to the thickness dimension of the sheet member is generated. Therefore, there is a problem that a useless gap is generated between the magnetic members, which causes increase in the size of the stacked core in the stacking direction. In particular, in a case where the thickness dimension of the sheet member is increased, the gap becomes large.

There is provided a stacked core for a stationary induction apparatus which is configured by stacking magnetic members, and in which a suitable air gap for controlling a magnetic characteristic can be provided without causing increase in size in the stacking direction.

A stacked core for a stationary induction apparatus according to an embodiment including upper and lower yoke portions configured by stacking a plurality of plate-shaped magnetic members, and including at least two leg portions configured by stacking a plurality of plate-shaped magnetic members, and vertically connecting both ends of the upper and lower yoke portions, the stacked core being configured by butt-joining the yoke portions and the leg portions, wherein joint surfaces where the yoke portions and the leg portions are joined have protrusions formed from the plurality of magnetic members, and recesses formed from the plurality of magnetic members alternately, and the yoke portions and the leg portions are configured to be butted in such a form that the protrusions and the recesses mesh with each other, sheet-like magnetic insulators are each disposed in a butt-joint portion between the protrusions and the recesses in such a form as to bend in a bellows shape along a butt line, and an air gap is provided, and in a relationship between the number of the stacked magnetic members forming each of the protrusions and the number of the stacked magnetic members forming each of the recesses, the number of the stacked magnetic members forming each of the protrusions is made smaller than the number of the stacked magnetic members forming each of the recesses corresponding to a thickness of the magnetic insulator.

DESCRIPTION OF EMBODIMENTS

(1) First Embodiment

Figure 1:
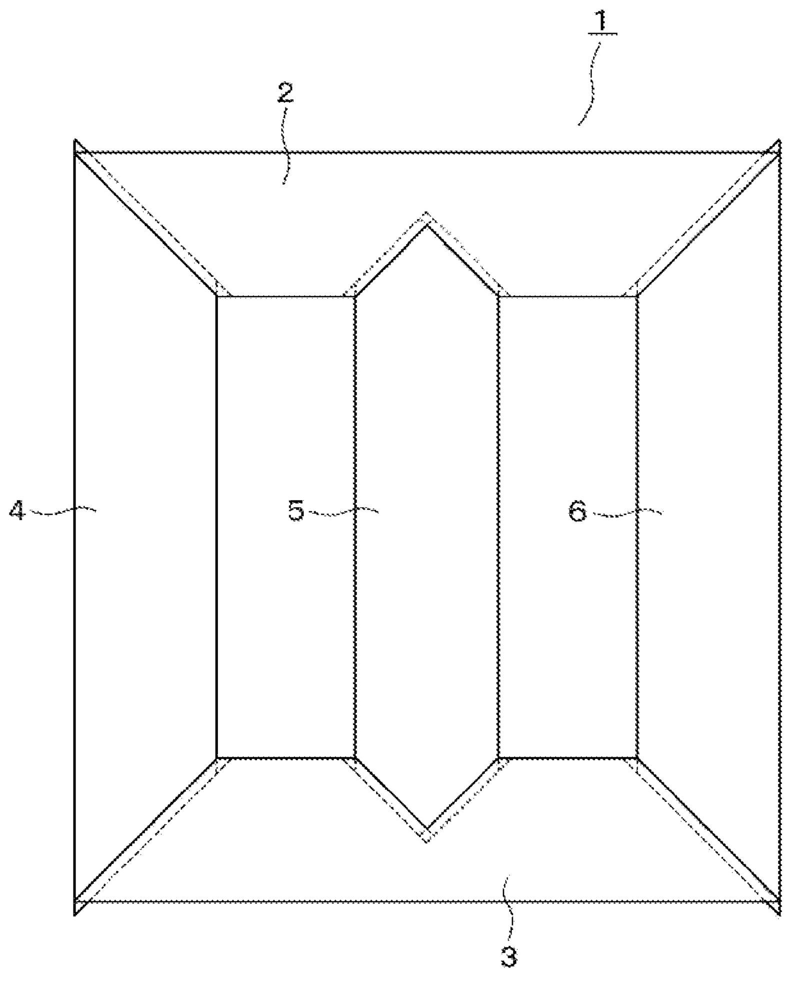
FIG. 1 is a front view schematically illustrating an overall configuration of a stacked core according to a first embodiment.

Hereinafter, a first embodiment applied to a three-phase transformer as a stationary induction apparatus will be described with reference to FIG. 1 to FIG. 4. FIG. 1 illustrates the overall configuration of a stacked core 1 for a transformer according to this embodiment. This stacked core 1 includes an upper yoke portion 2 and a lower yoke portion 3 extending in the left-right direction in the drawing, and three first, second and third leg portions 4, 5, and 6 extending in the vertical direction and vertically connecting these yoke portions 2 and 3. A winding wire (not illustrated) is attached to each of the leg portions 4, 5 and 6. In a case where the direction is mentioned in the following description, description will be made while the state of FIG. 1 is defined as a front view.

Figure 3:
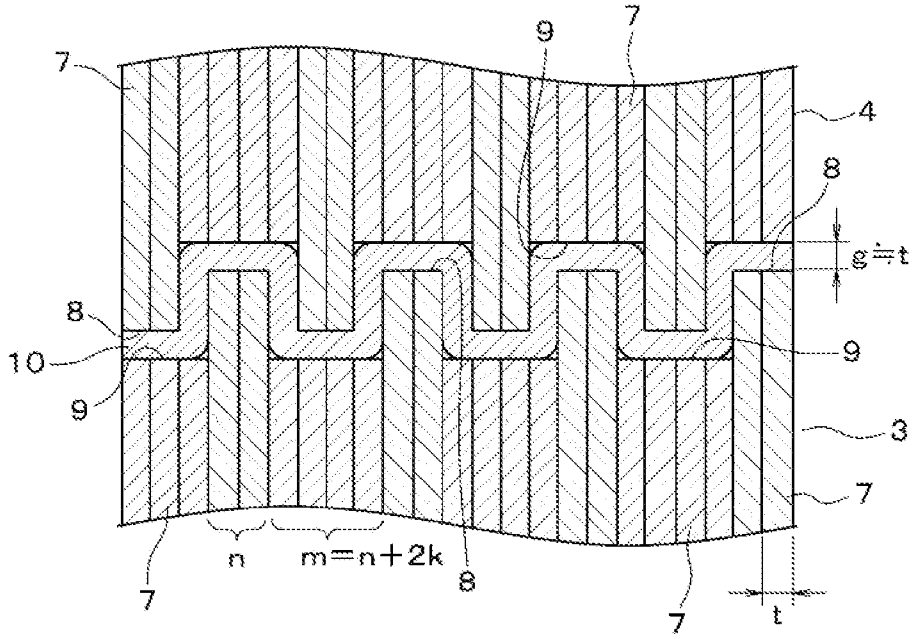
FIG. 3 is an enlarged sectional view of a joint portion between a yoke portion and a leg portion according to the first embodiment.

The yoke portions 2 and 3 and the leg portions 4, 5 and 6 constituting the stacked core 1 are each configured by stacking a plurality of, for example, silicon steel sheets 7 (see FIG. 3) as plate-shaped magnetic members in the front-rear direction in the drawing. The yoke portions 2 and 3 and the leg portions 4, 5, and 6 are but-joined to form the entire stacked core 1. In this embodiment, as illustrated in FIG. 3, the thickness of the single silicon steel sheet 7 is defined as a dimension t. To take a specific example, the thickness dimension t is, for example, 0.2 to 0.3 mm.

At this time, the stacked core 1 of this embodiment has a so-called frame-shaped butted form in which upper, lower, left and right four corners, at which left and right ends of the yoke portions 2 and 3, and upper and lower ends of the first and third leg portions 4 and 6 are joined to each other, in butted portions, are obliquely cut at an angle of approximately 45 degrees. Further, joining between central portions of the yoke portions 2 and 3 and both upper and lower ends of the second leg portion 5 is a butting form of recesses and protrusions in which the upper and lower portions of the second leg portion 5 have V-shaped protrusions, a so-called lap joint type joining method.

Figure 4:
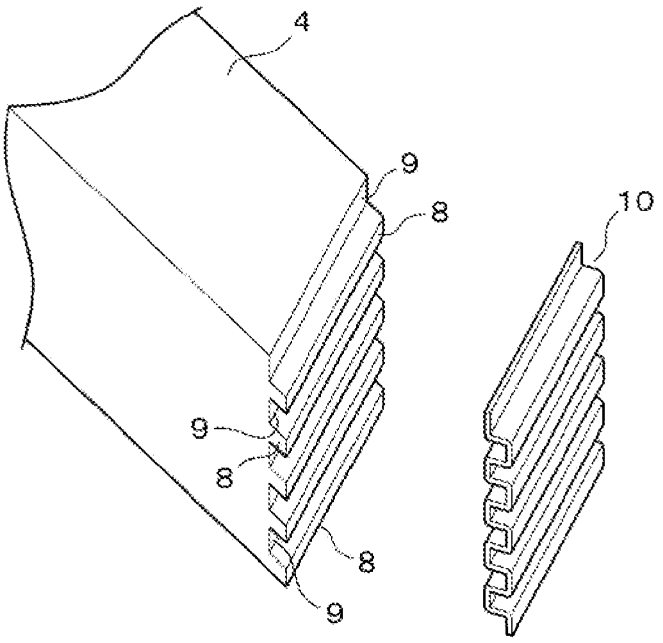
FIG. 4 is an exploded perspective view illustrating a state in which an insulator is attached to a joint surface according to the first embodiment.

As partly illustrated in FIG. 3 and FIG. 4, butt-joint portions of the yoke portions 2 and 3 and the first, second, and third leg portions 4, 5, and 6 are made of silicon steel sheet each having a form in which protrusions 8 and recesses 9 are alternately provided in the stacking direction of the silicon steel sheets 7. The yoke portions 2 and 3 and the leg portions 4, 5 and 6 are joined at a total of eight joint portions. In this case, one V-shaped portion of the second leg portion 5 is counted as two locations. As illustrated in FIG. 3, in the eight joint portions, the protrusions 8 and the recesses 9 are butt-joined in such a form as to mesh with each other, and a so-called lap joint type joining method is adopted.

More specifically, in this embodiment, the protrusions 8 each composed of the silicon steel sheets 7, the number of stacked sheets of which is n, for example, 2 are formed, as illustrated in FIG. 3. Further, the recesses 9 each composed of the silicon steel sheets 7, the number of stacked sheets of which is m, for example, 4 are formed. In this case, it is assumed that each of the yoke portions 2 and 3 and the leg portions 4, 5, and 6 is formed by stacking a large number of the silicon steel sheets 7 previously cut to a predetermined size while aligning the cut silicon steel sheets 7 in predetermined order, so that a plurality of sets of the protrusions 8 and the recesses 9 are alternately formed at the joint portions.

For example, regarding the single leg portion 4, the joint portions are provided at both upper and lower ends. Herein, the protrusions 8 are disposed in the same positions in both ends in the stacking direction. The protrusions 8 and the recesses 9 may be formed at both the upper and lower ends in reverse order in the stacking direction. It goes without saying that the protrusions 8 and the recesses 9 of the joint portions of the yoke portions 2 and 3 on mating sides to be joined are provided in a corresponding relationship, that is, a relationship in which the recesses and the protrusions meshes with each other. At this time, in this embodiment, it is sufficient to prepare the silicon steel sheets 7 having at most three kinds of lengths, namely, the silicon steel sheets 7 each having both ends that become the protrusions 8, the silicon steel sheets 7 each having both ends that become the recess 9, and the silicon steel sheets 7 each having both ends, one of which becomes the protrusion 8, and the other end of which becomes the recess 9. In a case where the protrusions 8 and the recesses 9 are formed at both ends in the stacking direction in the reverse order, it is sufficient to prepare the silicon steel sheets 7 each having both ends, one of which becomes the protrusion 8, and the other end of which becomes the recess 9, and the silicon steel sheets 7 having at two kinds of lengths, namely, the silicon steel sheets 7 each having both ends that become recesses 9.

In this embodiment, as illustrated in FIG. 3 and FIG. 4, a butt line is formed between the yoke portions 2 and 3 and the leg portions 4, 5 and 6 in such a form as to extend in the stacking direction while bending in a bellows shape, that is, in such a shape that the recesses and the protrusions are continuously repeated while bending at a right angle. In FIG. 3, the joint portion between the first leg portion 4 and the lower yoke portion 3 is illustrated as a representative. Then, a sheet-like magnetic insulator 10 bent in a bellows shape is disposed along the butt line, so that an air gap is provided. The magnetic insulator 10 is made of an insulating paper such as aramid paper, and has, for example, a thickness dimension g equivalent to the thickness dimension t of the silicon steel sheet 7. Consequently, the air gap corresponding to the thickness dimension g of the magnetic insulator 10 is provided.

Therefore, the air gap is formed between tip surfaces of the protrusions 8 and bottom surfaces of the recesses 9 and between side surfaces of the protrusions 8 and inner surfaces of the recesses 9 in such a shape that the protrusions and the recesses are continuously repeated in a U-shape while bending at a right angle. In this case, as illustrated in FIG. 4, the magnetic insulator 10 is configured by previously shaping a single sheet into a bellows-shaped bent form, and, for example, is fitted on each of the butt surfaces of the leg portions 4, 5, and 6 so as to cover the protrusions 8 and the recesses 9. Thereafter, the yoke portions 2 and 3 and the leg portions 4, 5, and 6 are joined.

At this time, in this embodiment, the relationship between n that is the number of stacked silicon steel sheets 7 forming the protrusion 8 and m that is the number of stacked silicon steel sheets 7 forming the recess 9 satisfies $m=(n+2k)$. k denotes a value indicating the relationship of the thickness dimension g of the magnetic insulator 10 with respect to the thickness dimension t of the single silicon steel sheet 7. That is, k denotes a value indicating how many sheets (k sheets) of the silicon steel sheets 7 to which the thickness dimension g of the magnetic insulating portion 10 corresponds, and is a natural number. In this embodiment, $k=1$ is established. Therefore, $m=(n+2)$ is established, and when n is 2, m is 4. Thus, the number of the stacked silicon steel sheets 7 forming the protrusion 8 is made smaller than the number of the stacked silicon steel sheets 7 forming the recess 9. Consequently, the magnetic insulator 10 is disposed substantially closely between the protrusions 8 and the recesses 9.

Now, an assembly procedure of the stacked core 1 having the above configuration will be briefly described. The upper yoke portion 2 and the lower yoke portions 3, the three leg portions 4, 5 and 6 constituting the stacked core 1 are each obtained by stacking a plurality of the silicon steel sheets 7 previously cut into a required shape, and fixing and integrating the staked silicon steel sheets 7, for example, by adhesion. At this time, each of the joint surfaces of the leg portions 4, 5 and 6 is formed so as to have the protrusions 8 and the recesses 9 alternately in the stacking direction. The joint surfaces of the yoke portions 2 and 3 are formed with the recesses 9 and the protrusions 8 in such a form as to correspond to the protrusions 8 and the recesses 9, that is, in such a form as to mesh the protrusions 8 and the recesses 9 with each other.

Figure 2:
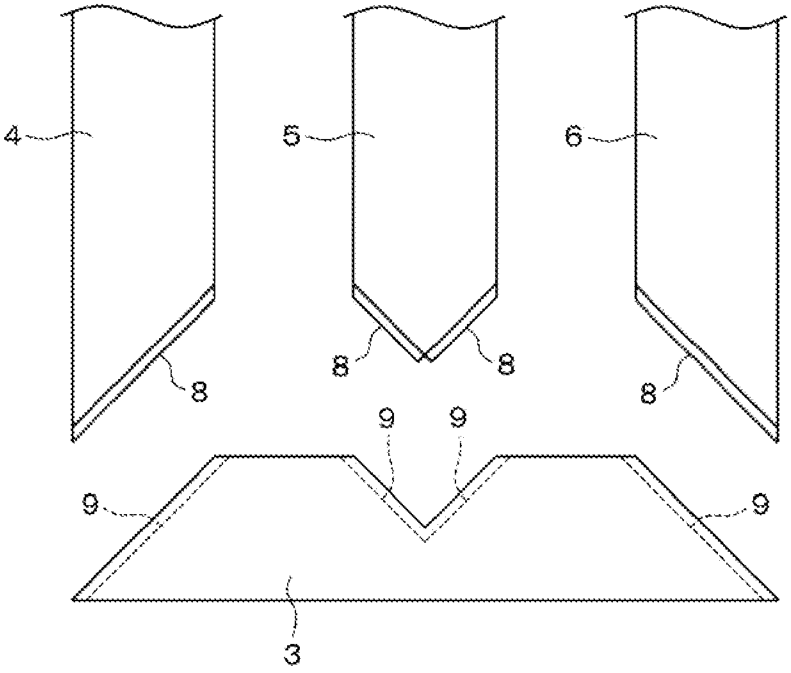
FIG. 2 is a front view of an exploded state of a lower half of the stacked core according to the first embodiment.

As illustrated in FIG. 4, for example, the magnetic insulator 10 previously shaped into the bellows shape in accordance with the protrusions 8 and the recesses 9 is fitted and disposed on each of the joint surfaces of the leg portions 4, 5 and 6. Then, as illustrated in FIG. 2, the respective joint surfaces of the leg portions 4, 5, and 6 are butt-joined to the upper joint portion of the lower yoke portion 3 such that the protrusions 8 and the recesses 9 mesh with each other.

Thereafter, a winding wire (not illustrated) is attached to each of the leg portions 4, 5 and 6, and then the upper yoke portion 2 is butt-joined such that the protrusions 8 and the recesses 9 mesh with each other in the same manner. For joining at this time, for example, a well-known method using a clamp member or a fastening member can be adopted.

As a result, as illustrated in FIG. 3, at the joint portions between the yoke portions 2 and 3 and the leg portions 4, 5 and 6, the protrusions 8 and the recesses 9 alternately provided in the stacking direction are butt-joined in such a form as to mesh with each other, by a so-called lap joint method. At each joint portion, the butt line is formed in such a form as to extend in the stacking direction while bending in a bellows shape, and the sheet-like magnetic insulator 10 is disposed along the butt line, so that the air gap is provided at each joint portion. The magnetic insulator 10 previously shaped in the bellows shape only needs to be assembled to each joint surface, and it goes without saying that the assembling of the magnetic insulators 10 is facilitated. The magnetic insulators 10 may be fitted and disposed on the yoke portions 2 and 3 sides, and be butt-joined to the leg portions 4, 5 and 6 sides.

According to the stacked core 1 of this embodiment as described above, the following actions and effects can be obtained. That is, in the stacked core 1 having the above configuration, the magnetic insulators 10 are disposed between the yoke portions 2 and 3 formed by stacking the silicon steel sheets 7, and the leg portions 4, 5 and 6, and the air gaps are provided. At this time, the relationship between the number of the stacked silicon steel sheets 7 forming the protrusion 8 and the number of the stacked silicon steel sheets 7 forming the recess 9 is as follows. That is, the number of the stacked silicon steel sheets 7 forming the protrusion 8 is made smaller than the number of the stacked silicon steel sheets 7 forming the recess 9 corresponding to the thickness dimension g of the magnetic insulator 10.

More specifically, in this embodiment, as illustrated in FIG. 3, the thickness dimension g of the magnetic insulator 10 corresponds to the thickness dimension t of the single (k=1) silicon steel sheet 7. On the other hand, each protrusion 8 is formed from the n silicon steel sheets 7, the two silicon steel sheets 7 in this case, and each recess 9 is formed from the (n+2) silicon steel sheets 7, the four silicon steel sheets 7 in this case. Consequently, a space in which the sheet-like magnetic insulator 10 is closely disposed along the butt line is formed between the protrusions 8 and the recesses 9, and the magnetic insulator 10 is disposed in the space in such a form as to bend in the bellows shape, so that the air gap is provided.

With this configuration, even in a state in which the silicon steel sheets 7 are closely stacked, no extra gap is formed in the stacking direction, and it is possible to suppress the increase of each part of the stacked core 1. As a result, according to this embodiment, the silicon steel sheets 7 are stacked, and joining in the state in which the protrusions 8 and the recesses 9 mesh with each other is performed, so that it is possible to obtain an excellent effect that the suitable air gap for controlling a magnetic characteristic can be provided without causing increase in size in the stacking direction.

In particular, in this embodiment, the joint portions of the yoke portions 2 and 3 and the leg portions 4, 5 and 6 are butted in an inclined state to form a frame-shaped joint, and therefore the area of the joint surfaces can be further increased. Further, it is possible to increase the magnetic path area and reduce the magnetic resistance. As a transformer, application to, for example, a transformer for power electronics used in a data center or the like is possible, and it is possible to save space, improve efficiency, and improve reliability.

(2) Second Embodiment

Figure 5:
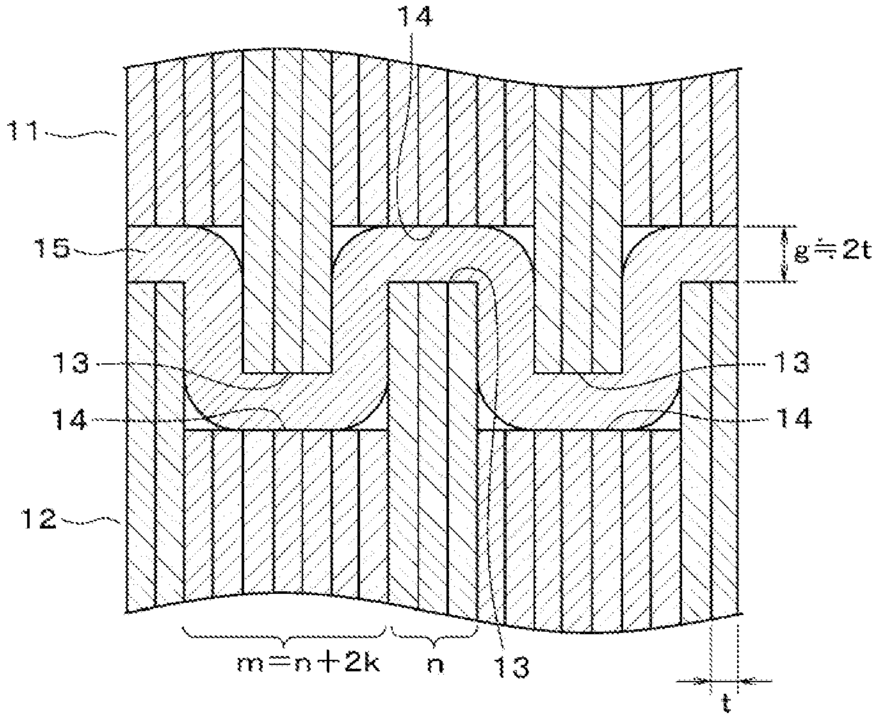
FIG. 5 is an enlarged sectional view of a joint portion between a yoke portion and a leg portion according to a second embodiment.

FIG. 5 illustrates a second embodiment, and illustrates, for example, a configuration of a joint portion between a left leg portion 11 and a lower yoke portion 12. This second embodiment is different from the above first embodiment in the thickness dimension g of a sheet-like magnetic insulator 15 disposed between protrusions 13 and recesses 14, that is, the dimension of an air gap.

That is, in this embodiment, the thickness dimension g of the magnetic insulator 15 corresponds to twice (k=2) the thickness dimension t of a single silicon steel sheet 7 as a magnetic member. With this, each protrusion 13 is formed from the n silicon steel sheets 7, the three silicon steel sheets 7 in this case, and each recess 14 is formed from the (n+2k) silicon steel sheets 7, the seven silicon steel sheets 7 in this case. Consequently, a space in which the sheet-like magnetic insulator 15 is closely disposed along the butt line, the width dimension of which is 2t (=g), is formed between the protrusions 13 and the recesses 14, and the magnetic insulator 15 is disposed in the space in such a form as to bend in a bellows shape, so that an air gap is provided.

Therefore, also in this second embodiment, in a similar manner to the above first embodiment, the silicon steel sheets 7 are stacked, and joining in a state in which the protrusions 13 and the recesses 14 mesh with each other is performed, so that it is possible to obtain an excellent effect that the suitable air gap for controlling a magnetic characteristic can be provided without causing increase in size in the stacking direction.

Thus, the thickness dimension g of the magnetic insulator 15, that is, the dimension of the air gap can be made to correspond to an integral multiple of the thickness dimension t of the single silicon steel sheet 7 as a plate-shaped magnetic member. Consequently, it goes without saying that the air gap corresponding to the thickness dimension of the single silicon steel sheet 7 can be provided, and the magnetic insulator 15 having a large thickness, that is, a thickness dimension that is the integral multiple of the thickness dimension of the single silicon steel sheet 7 is adopted, and the size of the air gap can be adjusted. As a result, it is possible to control the magnitude of an excitation current in accordance with a request.

(3) Third Embodiment, Other Embodiment

Figure 6:
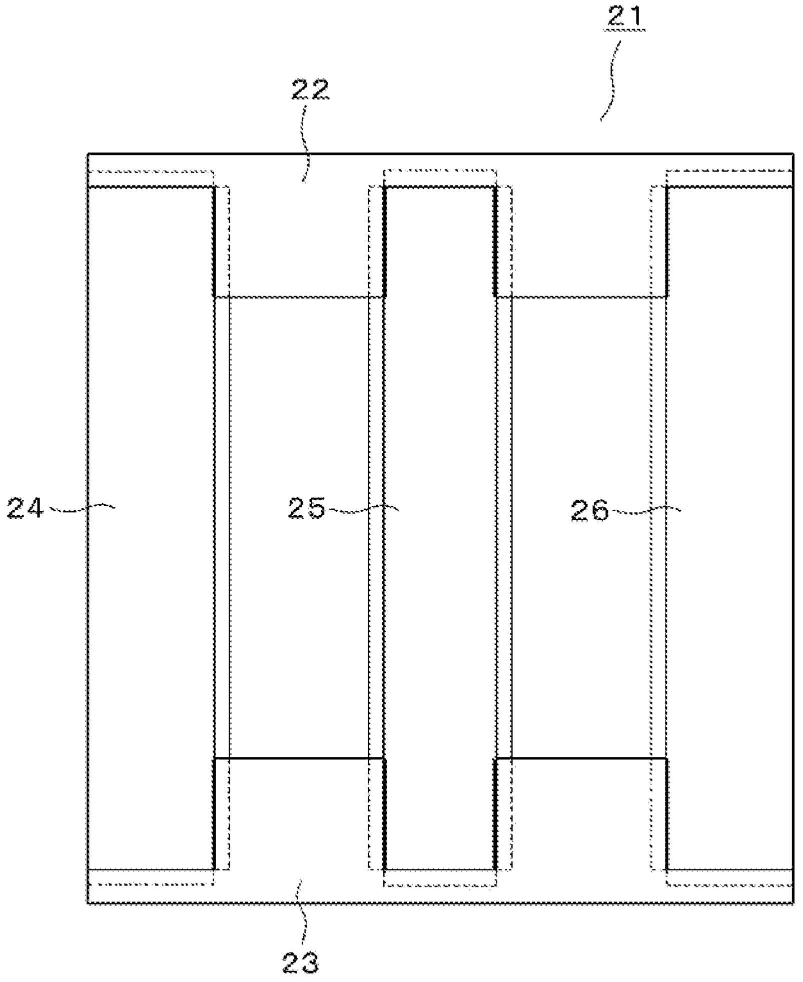
FIG. 6 is a front view schematically illustrating an overall configuration of a stacked core according to a third embodiment.

FIG. 6 illustrates a third embodiment, and schematically illustrates the overall configuration of a stacked core 21. This stacked core 21 also includes upper and lower yoke portions 22 and 23, and three leg portions 24, 25 and 26 that vertically connect the yoke portions 22 and 23. The yoke portions 22 and 23 and the leg portions 24, 25 and 26 are each formed by stacking a plurality of, for example, silicon steel sheets 7 as plate-shaped magnetic members in the front-rear direction in the drawing.

At this time, in the stacked core 21 of this embodiment, both left and right ends of each of the yoke portions 22 and 23 of the butt portions each have such a form as to be cut into an L-shape, and upper and lower ends of the first and third leg portions 24 and 26 are joined. In each of the upper and lower ends of the first and third leg portions 24 and 26, two surfaces that forms an L-shape and are to be joined to the yoke portions 22 and 23 are joint surfaces. On the other hand, central portions of the yoke portions 22 and 23 each have such a form as to be cut into a U-shape, and are joined to the upper and lower ends of the second leg portion 25. In each of the upper and lower ends of the second leg portion 25, three surfaces that forms a U-shape and are to be joined to the yoke portions 22 and 23 are joint surfaces.

Although not illustrated in detail, both joint surfaces of each of butt portions between the yoke portions 22 and 23 and the leg portions 24, 25 and 26 have a form in which protrusions 8 and recesses 9 are alternately provided in the stacking direction of the silicon steel sheets 7. The yoke portions 22 and 23 and the leg portions 24, 25 and 26 are butt-joined in such a form that the protrusions 8 and the recesses 9 mesh with each other. Although not illustrated, also in this case, in a similar manner to the above first embodiment, a sheet-like magnetic insulator 10 bent in a bellows shape is disposed along a butt line where the protrusions 8 and the recesses 9 mesh with each other, so that an air gap is provided.

The relationship between n that is the number of stacked silicon steel sheets 7 forming the protrusion 8 and m that is the number of stacked silicon steel sheets 7 forming the recess 9 corresponds to the thickness of the magnetic insulator 10, and n which is the stacked number on the protrusion 8 is smaller than m which is the stacked number on the recesses 9 side by 2k. Therefore, even in this third embodiment, the silicon steel sheets 7 are stacked, and joining in the state in which the protrusions 8 and the recesses 9 mesh with each other is performed, so that it is possible to obtain an excellent effect that the suitable air gap for controlling a magnetic characteristic can be provided without causing increase in size in the stacking direction.

The present invention is not limited to the aforementioned embodiments, and for example, various changes in values of n and m that each are the number of the stacked magnetic members, and the value of k can be made. Further, the stationary induction apparatus is not limited to a three-phase transformer, and may be a transformer other than the three-phase, for example, a single-phase transformer, and can be further applied to a reactor.

Some embodiments described above are presented as examples and are not intended to limit the scope of the invention. These novel embodiments can be implemented in various other embodiments, and various omissions, replacements, and changes can be made without departing from the gist of the invention. These embodiments and modifications thereof are included in the scope and gist of the invention, and are also included in the scope of the invention described in the claims and the equivalent scope thereof.

The invention claimed is:

1. A stacked core for a stationary induction apparatus comprising:

upper and lower yoke portions configured by stacking a plurality of plate-shaped magnetic members; and at least two leg portions configured by stacking a plurality of plate-shaped magnetic members and vertically connecting both ends of the upper and lower yoke portions, the stacked core being configured by butt-joining the yoke portions and the leg portions, wherein joint surfaces where the yoke portions and the leg portions are joined have protrusions formed from the plurality of magnetic members, and recesses formed from the plurality of magnetic members alternately, and the yoke portions and the leg portions are configured to be butted in such a form that the protrusions and the recesses mesh with each other, sheet-like magnetic insulators are each disposed in a butt-joint portion between the protrusions and the recesses in such a form as to bend in a bellows shape along a butt line, and an air gap is provided, and in a relationship between the number of the stacked magnetic members forming each of the protrusions and the number of the stacked magnetic members forming each of the recesses, the number of the stacked magnetic members forming each of the protrusions is made smaller than the number of the stacked magnetic members forming each of the recesses corresponding to a thickness of the magnetic insulator.

2. The stacked core for a stationary induction apparatus according to claim 1, wherein joint portions between the yoke portions and the leg portions are butted in an inclined state to form a frame-shaped joint.

3. The stacked core for a stationary induction apparatus according to claim 1, wherein a thickness dimension of the magnetic insulator corresponds to a thickness dimension of the single magnetic member.

4. The stacked core for a stationary induction apparatus according to claim 1, wherein a thickness dimension of the magnetic insulator corresponds to an integral multiple of the thickness dimension of the single magnetic member.

5. The stacked core for a stationary induction apparatus according to claim 2, wherein a thickness dimension of the magnetic insulator corresponds to a thickness dimension of the single magnetic member.

6. The stacked core for a stationary induction apparatus according to claim 2, wherein a thickness dimension of the magnetic insulator corresponds to an integral multiple of the thickness dimension of the single magnetic member.

* * * * *